United States Patent [19]
Lavric

[11] 3,713,876
[45] Jan. 30, 1973

[54] METHODS OF METAL COATING ARTICLES

[75] Inventor: Drago Lavric, Columbus, Ohio

[73] Assignee: Western Electric Company, Incorporated, New York, N.Y.

[22] Filed: April 7, 1970

[21] Appl. No.: 26,220

[52] U.S. Cl. ................117/102 M, 29/487, 29/503, 117/114 R, 117/114 B, 117/227, 228/19, 228/37
[51] Int. Cl. ..........B23k 1/08, C23c 1/04, H05k 3/34
[58] Field of Search ..........117/102 M, 114 R, 114 B; 228/19, 37; 29/503, 487

[56] References Cited

UNITED STATES PATENTS

| | | | |
|---|---|---|---|
| 3,482,755 | 12/1969 | Raciti | 29/503 X |
| 2,740,193 | 4/1956 | Pessel | 29/503 X |
| 3,210,182 | 10/1965 | Funari | 228/19 UX |
| 3,311,495 | 3/1967 | Snider et al. | 117/102 M |
| 2,993,272 | 7/1961 | Carlzen et al. | 228/37 X |
| 3,266,136 | 8/1966 | Gutbier | 29/503 X |
| 3,439,854 | 4/1969 | Walker | 228/37 X |

FOREIGN PATENTS OR APPLICATIONS 1,099,330  1/1968  Great Britain..........................228/37

Primary Examiner—Alfred L. Leavitt
Assistant Examiner—J. R. Batten, Jr.
Attorney—W. M. Kain, R. P. Miller and Don P. Bush

[57] ABSTRACT

Selected areas of articles to be joined by the application of solder to the areas is accomplished by moving the articles in a selected path over a wave of molten solder. Portions of the molten solder adheres to and solidifies subsequently around the selected areas so that the areas of the articles are joined thereby. As the selected areas are moved away from the wave of molten solder, portions of the solder, which adhere to the selected areas of the articles, tend to flow downwardly from the selected areas by gravity and would normally solidify and thereby form solder icicles. However, the articles being joined are passed over a heated solder bath immediately after passing over the wave of molten solder in such proximity that as the solder icicles tend to form, the lowermost portions of the icicles engage the heated solder bath and remain in a flowable state whereby the excess solder which is tending to form the icicles is drawn by adhesion into the heated solder bath.

6 Claims, 4 Drawing Figures

PATENTED JAN 30 1973 3,713,876
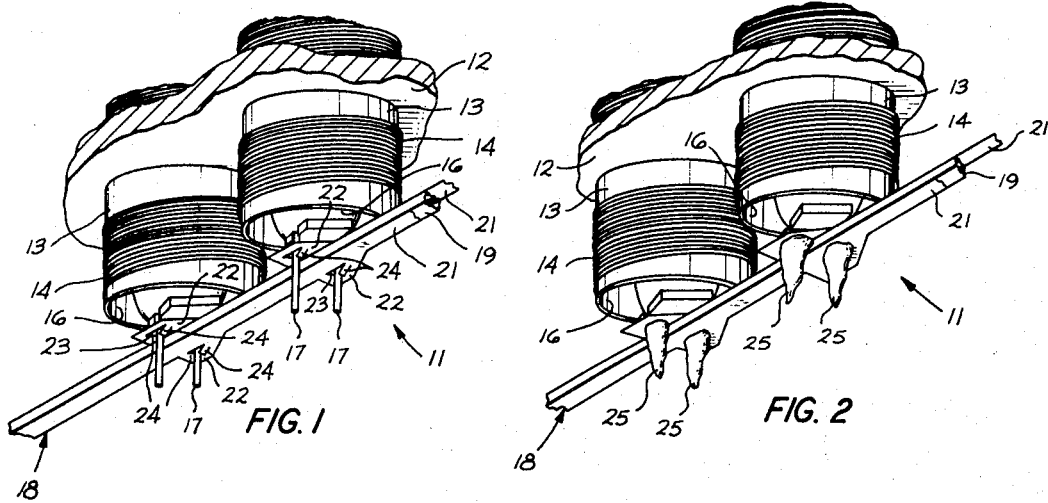
FIG. 1
FIG. 2
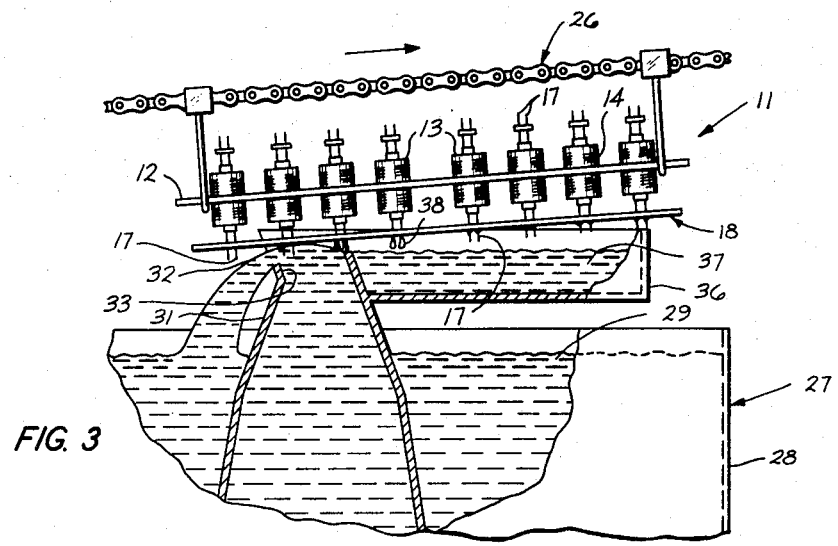
FIG. 3
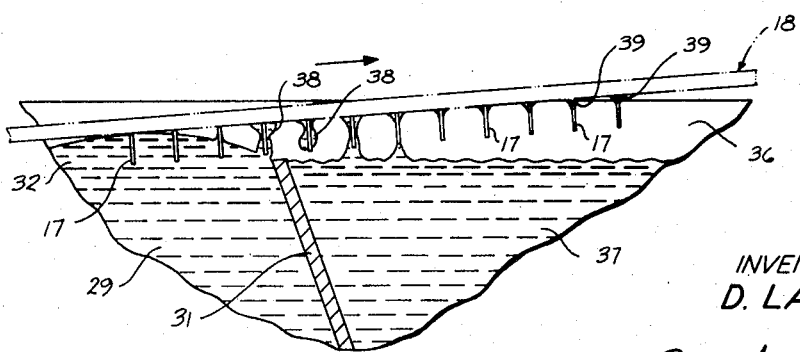
FIG. 4
INVENTOR
D. LAVRIC
BY *[signature]*
ATTORNEY

METHODS OF METAL COATING ARTICLES

BACKGROUND OF THE INVENTION

1. Field of the Invention

This invention relates to methods of metal coating articles and particularly to the application of a material, such as solder, onto selected areas of articles to be joined by utilizing a wave-soldering technique.

2. Description of the Prior Art

In the manufacture of many types of electrical circuit devices, such as printed wiring boards, circuits are constructed by assembling leads of electrical components with land areas of printed wiring which is secured to the boards. A metal coating, such as solder, is then applied to the areas where the leads of the components are positioned adjacent to the land areas of the printed circuits. In addition, other types of devices which require electrical connection between leads of components and electrical conductive paths, such as strapping, is also manufactured in a secured, joined assembly by applying solder to the areas where the leads are positioned adjacent to the associated strapping.

One basic method of applying the metal coating to the areas to be joined, such as the component leads with the metal strapping, involves the use of a wave-soldering device wherein a molten solder from a bath is circulated in such a manner that portions of the solder are pumped through a nozzle to form a wave of solder which is directed normally upwardly and then is returned to the solder bath for reheating and recirculation. The areas of the articles to be joined are passed through the uppermost portions of the wave of solder whereby portions of the solder cling to the metallic areas engaged thereby and are subsequently solidified as the selected areas to be joined are moved away from the wave of solder. Subsequently, the portions of the solder, which cling to the metallic of the articles to be joined, solidify thereby providing a secure metallic coating formed about the selected areas of the articles to be joined. In this manner, the selected areas of the articles are secured together mechanically and electrically.

Frequently, as the selected areas of the articles to be joined pass through the wave of molten solder, excessive amounts of the solder cling to the selected areas. As the articles are moved away from the wave of solder, the clinging solder remains in a flowable state for a brief period until sufficient cooling effects the solidifying of the solder. During the period when the selected areas of the articles is being moved away from the wave of solder and the solder subsequently solidifies, the excess solder tends to flow, by the force of gravity, downwardly away from the selected areas. However, before substantial amounts of the flowing solder can drop from the selected areas of the articles to be joined, the flowing solder solidifies thereby forming various shaped configurations of excess solder extending outwardly and undesirably from the selected areas of the articles to be joined. These irregularly shaped excessive amounts of solder are referred to as icicles. Frequently, the solder icicles cause undesirable bridging of adjacent areas of the articles being joined and subsequently results in deficient operation of the electrical circuits associated with the articles being joined. In addition, the excessive amounts of solder used in this process are costly.

In addition, this undesirable result also occurs where a single article is to be metal coated. Excessive amounts of the metal coating tend to drip or fall from the article but, instead, form icicles as the applied metal coating solidifies. This results in a costly coating operation and the necessity of a subsequent deburring operation to remove the icicles from the single article.

Many techniques have been employed in attempts to reduce the number of and minimize the effects of excessive metallic coating such as solder icicles. Generally, these techniques have produced some success in limiting the number of icicles and reducing the excessive amounts of the metallic coating. HOwever, the prior art devices still permit icicles and excessive metal coating buildup to be formed during a wave-soldering operation and, in some cases, use additives in the solder bath which may reduce the number of icicles formed but which may also reduce the quality of the metal coating subsequently formed on the selected areas of the articles to be joined.

Therefore, it is apparent that a solution to the continuing problem of the development of solder icicles in a wave-soldering operation is of primary importance in the manufacture of various types of electrical circuits where leads of components are to be secured electrically and mechanically with associated land areas of printed wiring or other types of electrical devices such as conductive strapping.

SUMMARY OF THE INVENTION

It is, therefore, an object of this invention to provide new and improved methods of the coating of articles with a metal.

Another object of this invention is to provide new and improved methods of joining selected areas of articles by utilizing a wave-soldering technique.

Still another object of this invention is to provide new and improved methods of joining selected areas of articles by utilizing a wave-soldering technique and eliminating substantially solder icicles which tend to form subsequent to the wave-soldering operation.

A method of applying metal coating to an article embodying certain principles of the invention may include the steps of moving selected areas of an article to be coated through a wave of molten metal such as solder so that molten solder is applied to the selected areas, maintaining in a flowable state excessive amounts of solder which may be clinging to the selected areas of the article to be coated after the selected areas have been moved through the wave of molten solder to permit the excessive solder to tend to move away from the selected areas of the article and drawing by force of the flowable excessive amounts of solder away from the selected areas of the article so that only a desired amount of solder remains as a coating on the selected areas.

BRIEF DESCRIPTION OF THE DRAWINGS

Other objects and advantages of the present invention will be apparent from the following detailed description when considered in conjunction with the accompanying drawings in which:

FIG. 1 is a partial perspective view showing portions of a switching device having component leads assembled with associated conductive strapping;

FIG. 2 is a partial perspective view of the portions of the switching device of FIG. 1 having excessive amounts of solder located about the assembled component leads and associated conductive strapping;

FIG. 3 is a partial side view showing the switching device and the component leads assembled with the associated conductive strapping being moved through a wave of solder and subsequently over a heated solder bath in accordance with certain principles of the invention;

FIG. 4 is a partial sectional view showing the component leads of the switching device and the associated conductive strapping being moved through the wave of solder and subsequently over the heated bath of FIG. 3 in accordance with certain principles of the invention.

DETAILED DESCRIPTION

Referring now to FIG. 1, there is illustrated a portion of a switching device, designated generally by the reference numeral 11. The switching device 11 includes a support plate 12 for supporting a plurality of molded plastic coil forms 13—13 which extend from opposite sides of the plate. Windings 14—14 are wound about the coil forms 13—13. A pair of bottled contacts (not shown) are positioned within a central opening 16 of each coil form 13 so that leads 17—17 of the bottled contacts extend outwardly from the associated openings of the coil forms in a direction parallel with the axis of the associated coil forms.

A conductive strapping, designated generally by the reference numeral 18, includes a longitudinal flat strip 19, composed of an insulating material, for supporting conductive strips 21—21 on opposite sides thereof. Each conductive strip 21 is formed with a plurality of selectively spaced, lateral sections 22—22. Each of the lateral sections 22—22 includes a punchout 23 which forms a pair of tabs 24—24. The conductive strapping 18 is assembled with the switching device 11 so that the leads 17—17 of the bottled contacts project through associated punchouts 23—23 and are held frictionally in the assembled position by the associated pairs of tabs 24—24.

The assembled switching device 11 and the conductive strapping 18 are moved so that the assembled leads 17—17 and the associated lateral sections 22—22 with the pair of tabs 24—24 of the conductive strips 21—21 are moved through a wave of the molten solder (not shown). In this manner, portions of the molten solder engage and cling to at least the leads 17—17 and the associated lateral sections 22—22 of the conductive strips 21—21 to facilitate mechanical and electrical securing of the leads and the conductive strips.

As each of the leads 17—17 exits from the wave of molten solder, excessive amounts of the molten solder cling to the assembled areas of the leads and the associated lateral sections 22—22 of the strapping 18. Since the leads 17—17 of the conductive strapping 18 are extending substantially downwardly, the excessive amounts of the molten solder tend to flow downwardly, by the force of gravity, and would fall away from the leads and the conductive strapping if the excessive amounts of solder remained in the molten state. However, the portions of the molten solder solidify before the solder falls away from the leads 17—17 and the conductive strapping 18 and thereby forms undesirable solder icicles.

Referring now to FIG. 2, there is illustrated a portion of the switching device 11 assembled with the conductive strapping 18 and having solder icicles 25—25 formed thereon. The solder icicles 25—25 are undesirable and frequently cause deficient operation of the switching device 11 because of bridging of the soldered connections. The solder icicles 25—25 also create an untidy connection and require costly amounts of additional solder.

In the manufacture of other types of electrical units, such as printed wiring boards (not shown), leads of components may extend through the board and be positioned adjacent to associated land areas of printed wiring formed on the board. The extended leads of the components may remain in the extended position or may be formed against the associated land areas and thereafter passed through the wave of the molten solder to facilitate the securing of the component leads with the associated land areas. However, the formation of the solder icicles also occurs in the soldering of component leads of land areas of printed wiring and could result in undesirable bridging of adjacent land areas and also limits the minimum dimension within which the printed wiring boards could subsequently be assembled in an environmental mounting.

Also, in the coating of individual articles (not shown) with a metal, excessive amounts of metal and undesirable icicles also form on the coated articles. Before these articles can be handled, the icicles must be removed by a costly operation. The excessive amounts of metal used in such a coating operation is also costly.

Referring now to FIG. 3, there is illustrated a portion of a conveyor 26 which supports the switching device 11 and conductive strapping 18. In addition, there is illustrated a soldering device, designated generally by the numeral 27, which includes a tank 28 and a bath of solder 29 which is maintained in the molten state within the tank by a heating source (not shown). In addition, a nozzle 31 extends upwardly from the bath of molten solder 29 and a pump (not shown) forces the molten solder upwardly through the nozzle so that a wave 32 of the solder is formed at an outlet 33 of the nozzle. The pump facilitates the continuous circulation of the molten solder 29 so that molten solder continues to appear in the wave 32.

A small tank 36 is attached to the trailing side of the nozzle 31 adjacent to the outlet 33 of the nozzle and extends horizontally a substantial distance away from the trailing side of the nozzle. As will be apparent from FIG. 3, the conveyor 26 moves the switching device 11 and the conductive strapping 18 angularly or obliquely away from the tank 36 as the conveyor passes over the tank. A bath of heated solder 37 is located in the tank 36 and is maintained at a temperature which is substantially below the temperature of the molten solder 29 but is sufficient to maintain the solder 37 in a fluid state. The conveyor 26 moves the switching device 11 and the associated conductive strapping 18 in a path so that the areas of the leads 17—17 and the associated lateral sections 22—22 (FIG. 1) of the conductive strapping are moved through the wave 32 of the molten solder 29 whereby excessive amounts 38 of the molten solder engage and cling to the areas of the leads and the conductive strapping after the areas have passed the wave of solder.

Referring now to FIGS. 3 and 4, as each successive lead 17 is moved away from the trailing side of the wave 32 of the molten solder 29, the excessive amount 38 of the solder clings to the leads and the associated lateral sections 22—22 (FIG. 1) of the conductive strapping 18 in a manner identical to the clinging of the molten solder to the leads wherein the icicles 25—25 (FIG. 2) were subsequently formed. However, if the excessive amount 38 of the solder 29 tends to fall, by gravity, in the initial process of the formation of the icicles 25—25 (FIG. 2), the lowermost extremities of the excessive amount of the solder are subjected to heat which is emanating upwardly from the heated solder 37 contained within the tank 36. This process of continued heating maintains the excessive solder 38 formed around the leads, as the conveyor 26 moves the switching device 11 and the conductive strapping over and obliquely away from the tank 36, leads 17—17 and the associated lateral sections 22—22 (FIG. 1) of the conductive strapping 18 in a flowable state even though the relative temperature of the excessive solder is now lower than the temperature of the solder in the molten state at the trailing edge of the wave 32 of the molten solder 29.

If the excessive amount 38 of the solder, which is maintained in the flowable state as it passes obliquely over the heated solder 37 within the tank 36, continues to fall from the areas of the leads 17—17 and the associated lateral sections 22—22 (FIGS. 1) of the conductive strapping 18, the lowermost extremities of the excessive amounts of the solder engage the upper surface of the bath of the solder 37. Since solder has certain adhesion and surface tension characteristics, the excessive amount 38 of the solder is pulled or drawn literally from the areas of each of the leads 17—17 and the associated lateral sections 22—22 (FIG. 1) of the conductive strapping 18 while the leads and conductive strapping are passing over the tank 36. This process permits a sufficient amount 39 of the solder to remain in the area of each of the leads 17—17 and the associated lateral sections 22—22 (FIG. 1) of the conductive strapping 18 to maintain a substantial mechanical and electrical connection between the leads and the associated lateral sections of the conductive strapping.

Utilization of the process of applying the metallic coating of the solder 29 to selected areas of the leads 17—17 and the associated portions of the conductive strapping 18 in combination with the excessive solder removal accomplished by the heated solder 37 in the tank 36 permits the metallic coating of articles without the formation of solder icicles. This process also permits an efficient utilization of the solder 29 since only the required amount 39 of solder remains on the selected areas of the assembled leads 17—17 and conductive strapping 18. The tank 36 is positioned so that when the level of the solder 37 is increased due to the excessive amounts 38—38 of the solder 29 being deposited into the tank from the leads 17—17 and the associated conductive strapping 18, the overflow portions of the solder will flow normally into the tank 27 and be mixed with the molten solder 29 for increased heating and subsequent circulation to continue the formation of the wave 32 of the solder 29.

What is claimed is:

1. A method of coating an article with a metal, which comprises the steps of:

moving selected areas of an article to be coated through a first bath of molten metal so that at least portions of the molten metal engage and cling to at least portions of the selected areas;

maintaining in a flowable state the portions of the metal clinging to the selected areas, including any excessive amounts of the metal which may be clinging to the selected areas, for a predetermined distance of travel away from the first bath of molten metal, and moving the article over a second bath of metal along a path wherein the article moves obliquely away from the second bath as the article passes over the second bath with the lower extremities of the excessive amounts of the metal clinging to the selected areas of the article being moved into the second bath of the metal while the article is moved obliquely away from the second bath, the metal of the second bath being maintained at a temperature lower than the temperature of the molten metal contained in the first bath while the excessive amounts of metal are maintained in the flowable state so that physical forces, resulting from the oblique movement of the article away from the second bath and from the engagement of the lower extremities of the excessive amounts of metal with the second bath at the lower temperature, draw any excessive amounts of the metal which may be clinging to the selected areas of the article away from clinging engagement with the selected areas during a period when the selected areas are over the second bath and when the metal which is clinging to the selected areas is maintained in the flowable state.

2. The method as set forth in claim 1 wherein the first bath of molten metal through which the selected areas of the article are moved is a wave of molten metal being directed into the path of movement of at least the selected areas of the article.

3. The method as set forth in claim 1 wherein the metal of the first and second baths is solder.

4. A method of coating an article with a metal, which comprises the steps of:

moving selected areas of an article to be coated through a first bath of molten metal so that at least portions of the molten metal engage and cling to at least portions of the selected areas;

immediately thereafter moving the selected areas of the article with the metal clinging thereto, including any excessive amounts of metal which may be clinging to the selected areas through an area which is maintained at a temperature sufficient to keep the metal which is clinging to the selected areas in a flowable state, and moving the article over a second bath of metal along a path wherein the article moves obliquely away from the second bath as the article passes over the second bath with the lower extremities of the excessive amounts of metal clinging to the selected areas of the article being moved into the second bath of the metal while the article is moved obliquely away from the second bath of metal so that forces of gravity and surface tension of the metal in the second bath will cooperate with forces exerted on the excessive amounts of metal passing through the second bath of metal to wipe and remove the excessive amounts of metal from the selected areas of the article during a period when the selected areas are over the second bath.

5. The method as set forth in claim 4 wherein the first bath of molten metal through which the selected areas of the article are moved is a wave of molten metal being directed into a path of movement of at least the selected areas of the article.

6. The method as set forth in claim 4 wherein the metal of the first and second bath is solder.

* * * * *